Aug. 16, 1960     M. CLAPP     2,948,924

TIRE SHAPING AND TREAD CENTERING DEVICE

Filed May 2, 1957     3 Sheets-Sheet 1

INVENTOR.
MAURICE CLAPP

BY
Christie, Parker & Hale
ATTORNEYS

Aug. 16, 1960 M. CLAPP 2,948,924
TIRE SHAPING AND TREAD CENTERING DEVICE
Filed May 2, 1957 3 Sheets-Sheet 2

INVENTOR.
MAURICE CLAPP
BY
Christie, Parker & Hale
ATTORNEYS

Aug. 16, 1960  M. CLAPP  2,948,924
TIRE SHAPING AND TREAD CENTERING DEVICE
Filed May 2, 1957  3 Sheets-Sheet 3

INVENTOR.
MAURICE CLAPP
BY
Christie, Parker & Hale
ATTORNEYS

`United States Patent Office`

2,948,924
Patented Aug. 16, 1960

2,948,924

TIRE SHAPING AND TREAD CENTERING DEVICE

Maurice Clapp, 1703 Rossmont, Redlands, Calif.

Filed May 2, 1957, Ser. No. 656,542

2 Claims. (Cl. 18—18)

This invention relates to tire retread apparatus and more particularly to tire inserting devices for use with tire retread equipment.

For a tire on the wheel of an automobile to function best, it is desirable that the center of the tread run concentrically with the center of the tire rim. If there is lateral skewing of the tread on the tire, it not only wears unnecessarily but non-uniformly. It is customary in retread operations to buff an old tire until it is uniformly smooth, apply cement, then place the new tread over the cement. A portion of the new tread is sometimes laterally displaced on the tire by the forces used to rigidly secure the tire in a mold during the vulcanizing process, and unfortunately this may not be discovered until the vulcanizing process is completed.

Previous instruments devised to insert a tire in a mold were substantially heavy and somewhat complex. Because they were bulky and required various mechanical adjustments before a tire was correctly inserted, hand-operated instruments were wearisome to use and very time consuming in operation.

With molds of various sizes and shapes, including those many years old as well as the more up-to-date ones, limited access within and beneath the mold generally impairs and often prohibits the use of bulky instruments, either hand-operated or power-operated types. The exertion of sufficiently powerful forces to properly position a tire in a mold, with the new tread in true alignment around the circumference of the tire, and the limited space in which to do so, constitute obstacles which this invention overcomes.

According to the present invention, a power-operated tire insertion tool is provided wherein bulk is minimized by simplified construction with light weight parts, resulting in reduced cost of manufacture and repair. Compactness and adaptability to molds of all sorts lend it versatility, and the speed and ease with which it may be used provide economies in time and energy of an operator.

According to the principles of this invention, a pair of spiders each having a central hub with an aperture therein, and a plurality of arms extending from the hub are connected to individual pressure segments. Each of the pressure segments is preferably arcuate in shape and has a plurality of grooves constituting a flat surface and a wall surface. The wall surface is preferably in the form of a right cone. The grooves of the pressure segments of one spider are disposed in opposing relationship with respect to the grooves of the pressure segment of the other spider. When tires of different diameter are placed between the spiders, the bead surface on the side of the tire engages the flat surface of a groove in the pressure segments.

One of the spiders may be supported in moveable relationship with respect to a tire mold with the other spider removeably positioned on a center post adapted to extend through the aperture in the hub of both spiders. The removeable spider may be secured on the center post as by a pin key in the center post and a key way in the hub of the spider. A cylinder and a piston, arranged with the center post extending into the cylinder and connecting with the piston, receive fluid under pressure, preferably air, by suitable lines connected to opposite ends of the cylinder. In order to permit air under pressure to be selectively supplied to either end of the cylinder, a suitable valving arrangement such as a four-way valve, for example, is provided.

Except for the detachable parts which are removed when inserting a tire, the foregoing assembly is preferably mounted in some portion of the mold structure in a space not normally used. The pressure segments, while arcuate in shape and tend to form a closed circle, are shortened so that each extends only a few inches on either side of its attached arm. Each pressure segment is long enough to properly grasp a tire bead, yet their aggregate weight is much reduced when compared to a solid rim made of the same material. Furthermore, the space between segments permits access to the tire for engaging it with a pull-out hook when removing a tire. Since the number of parts is small and each is made as light as possible, the total assembly is relatively light. Because the tire insertion tool of this invention is relatively light, it is readily installed and easily operated, particularly since the weight of the detachable spider has been reduced.

In molds of the type with space available therebeneath, the assembly may be mounted in the lower portion of the mold with the power actuated cylinder and lower spider slideably mounted to the mold. The mold may be used in the normal manner with no difficulty being imposed by the presence of the tire insertion tool. Once a tire is placed in a mold, it may be properly positioned by the apparatus of this invention by extending the center post upward, placing the detachable spider on the center post, applying high pressure air to the upper end of the cylinder and causing the upper and lower spiders to be drawn toward each other.

In some types of molds, especially various ones of the older molds, very little room is available below the mold. Some of the molds, for example, have a base plate across the bottom thereof. A tire may be properly inserted by the apparatus of the present invention even with such limited access. It may be desirable in such instances to place one spider in proper position on the base plate of the mold and provide the detachable spider with a cylinder, piston, flexible air lines and center post moveably positioned above the mold.

Another arrangement according to this invention is to provide in molds of the latter type a cylinder, center post and spider slideably mounted in the base of a mold and provide two 90° bends in the arms of the spiders whereby when the spiders rest on top of the cylinder, the pressure segments lie in and around the base of the cylinder where they may properly engage the beads of a tire.

If a tire is properly shaped before a mold is closed, there is less likelihood of undesirable skewing of the new tread, as by pinching or otherwise. For the purpose of insuring that a tire is correctly fitted before a vulcanizing operation, it is placed in an open mold, with a curing rim and air bag within the tire, and the spiders are tightened on the beads of the tire until the side wall bulge is reduced and the shape of the tire conformed with the shape of the matrix of the mold. With the tire mold open during this shaping operation, it is easy to observe the tire for visible strains, stresses, or deformations which might tend to skew the tread. Hence any discrepancy may be timely corrected.

The shape of the tire can be changed somewhat by clamping the beads of a tire toward each other after a curing rim and air bag have been inserted. The technique is to reduce side wall bulge until the contour of the tire conforms to the contour of a matrix. The ability to control side wall bulge makes it possible to conform the configuration of the tire to any one of several molds having proper tread width and tire diameter, thereby reducing the number of matrices required on hand.

These and other features of the present invention may be more fully appreciated when considered in the light of the following specification and the drawings, in which.

Figure 1:
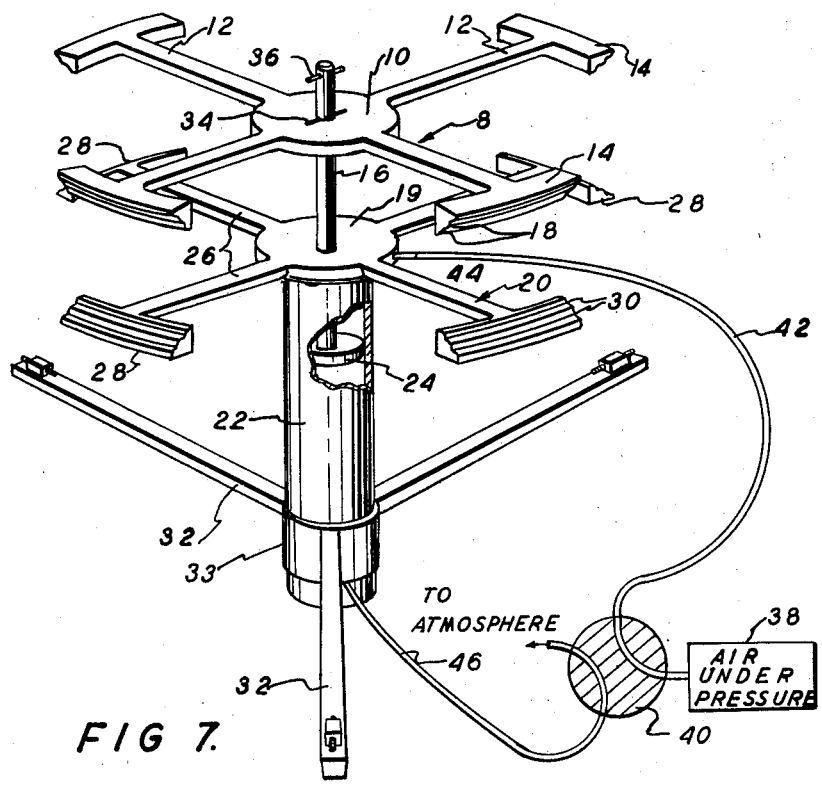
Fig. 1 is a perspective view illustrating one embodiment of the invention.
Figure 1A:
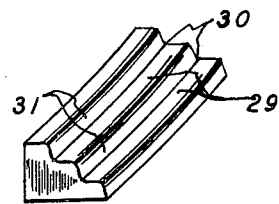
Fig. 1a is a perspective view showing in greater detail structural features of the pressure segments of Fig. 1.
Figure 2:
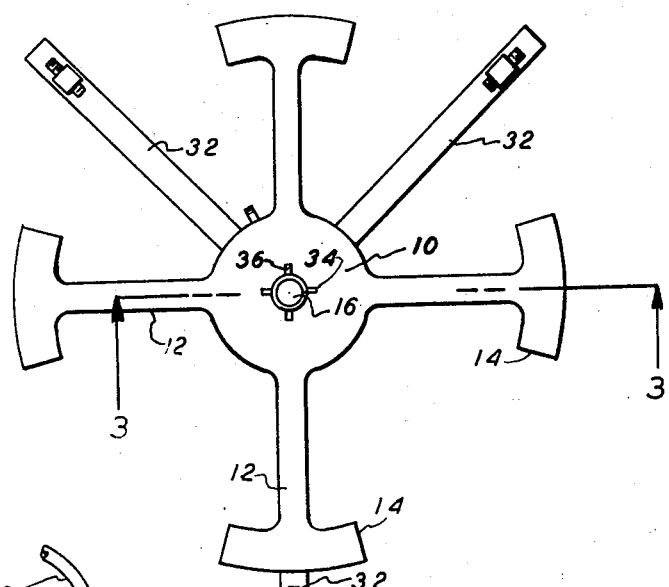
Fig. 2 is a plan view of Fig. 1.

Referring first to the embodiment of Figs. 1 and 2, a first spider 8, including a hub 10, four projecting arms 12 and pressure segments 14, is slidably positioned on a center post 16. The pressure segments 14 have a plurality of annular grooves 18 for the purpose of engaging the beads of tires having different diameters. The center post 16 extends through both the hub 19 of another spider 20 and a cylinder 22 and is connected to a piston 24 within the cylinder. The spider 20, like the spider 8, includes arms 26 to which are secured pressure segments 28 having annular grooves 30. The annular grooves 18 and 30 each include a flat surface 29 and a wall surface 31 in the form of a right cone. This is more clearly seen in Fig. 1a which is an expanded view showing the pressure segments of Fig. 1 in perspective. When the bead of a tire engages either wall surface 31, pressure along the cone-shaped wall causes the spider to align itself with the bead. The annular grooves of the pressure segments 14 and 28 of Fig. 1 are in opposing relationship whereby the annular grooves of the upper spider may engage the upper bead of a tire, and the annular grooves 30 of the lower spider may engage the lower bead of a tire. The above assembly may be mounted on a mold or other rigid structure associated with a mold by means of mounting brackets 32 and attached sleeve 33. The cylinder 22 fits loosely into the sleeve 33, and this permits some sidewise motion which aids the spider 20 to align itself with the bead of a tire.

It is desirable when inserting a tire into a mold to close the beads of the tire and position the tread in the mold before closing the mold for a curing operation. For the purpose of closing the beads, the upper spider 8 is rotated so that a keyway 34 is in alignment with pin key 36 in the center post. Compressed air, or other suitable fluid, is supplied from a source 38 through a four-way valve 40 to an air line 42 connected to a fitting 44 on the periphery of the hub 19. The compressed air passes through a passageway in the hub 19 to the upper end of the cylinder 22, and this forces the piston 24 downward. As the piston 24 travels downward, air in the lower chamber of the cylinder is exhausted through the air line 46 and the four-way valve 40 to the atmosphere. Air lines 42 and 46 may be rigid or flexible, though the latter is generally preferred. After the tire has been properly inserted in the mold, the four-way valve 40 is rotated 90° counterclockwise. Compressed air from the source 38 then enters the four-way valve 40 and passes through the air line 46 to the lower chamber of the cylinder 22, forcing the piston 24 upward. As the piston 24 moves up, air in the upper chamber of the cylinder is exhausted through the air line 42 to the atmosphere. Once the downward force exerted by the pin key 36 is released, the spider 8 can be readily removed by rotating it until the pin key 36 and keyway 34 are in alignment and then lifting it vertically from the center post 16.

Molds of various styles, new as well as old, present difficulties for proper mounting of tread centering devices presently in use because of the limited space available. The tread centering device of this invention is adaptable to most all types of tire molds, regardless of space limitations. Where a mold is not congested with structure beneath the central portion of a tire, the tread centering device of Figs. 1 and 2 is particularly adaptable since it can be permanently mounted beneath the mold, except for the detachable upper spider. This is especially advantageous to an operator because freedom of movement in carrying out a retreading operation is not impeded, first because he is not required to manipulate bulky or heavy equipment and second because freedom to manipulate the tire and the mold is not hampered in any respect.

Figure 3:
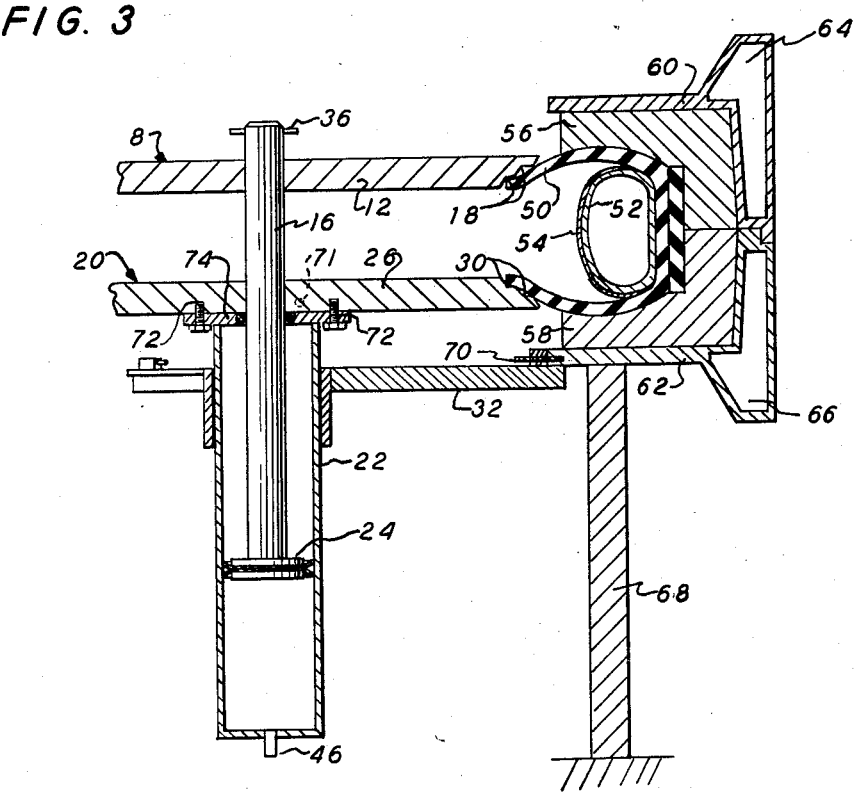
Fig. 3 is a sectional elevation taken along line 3—3 of Fig. 2 with an associated mold and tire shown in cross section.

Reference is made to Fig. 3 which shows the embodiment of Figs. 1 and 2 in cross section as it might appear employed with a tire mounted in a mold. A tire 50, having an air bag 52 and curing rim 54 positioned therein, is shown mounted in a matrix, comprising two halves 56 and 58. The matrix in turn is mounted in the body portion of a mold, likewise comprising two halves 60 and 62 having respective steam chambers 64 and 66. The mold is supported on the lower side by stanchions 68. As shown, the tread centering device is attached to the mold by brackets 32 with suitable means such as the threaded insert 70. As seen more clearly in this figure, the cylinder 22 is attached to the hub of the spider 20 with bolts 72. A gasket 74 is placed between the cylinder 22 and the spider 20 for the purpose of securing a tight air seal.

Figure 4:
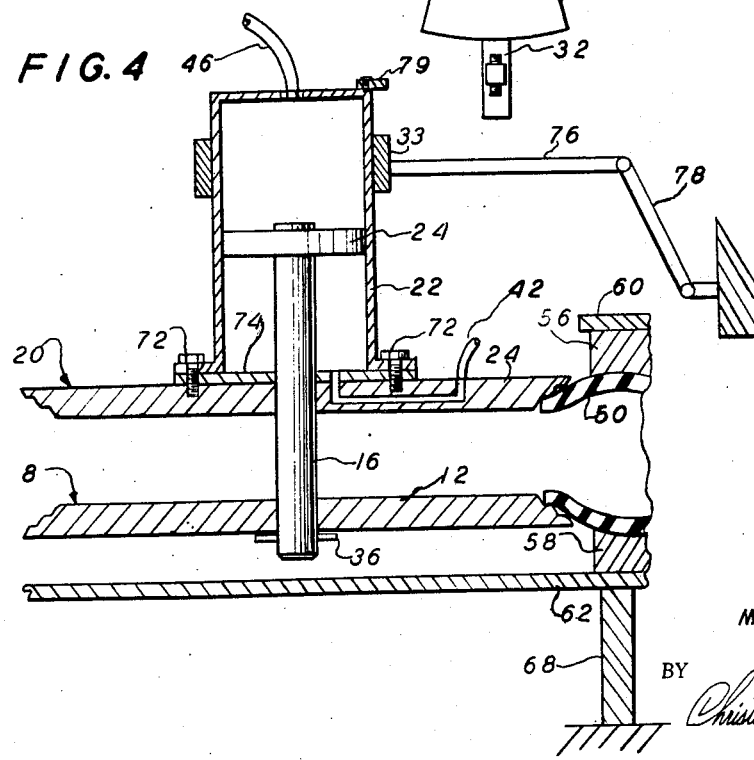
Fig. 4 is a cross sectional elevation of a further embodiment taken along a line similar to line 3—3 of Fig. 2.

Since in some instances tire molds include apparatus or a base plate which denies access to the area immediately below the tire, the apparatus of this invention may be arranged as shown in Fig. 4 on top of the mold. Here the air cylinder 22 and spider 20 are mounted as a unit over the tire with pivoted supporting arms 76 and 78 providing vertical and horizontal movement and the spider 8 is permitted to lie on the lower base plate 62 of the mold when not in use. A rotatable arm 79 prevents the cylinder 22 from slipping downward through the sleeve 33. The air lines in this arrangement are flexible ones.

Figure 5:
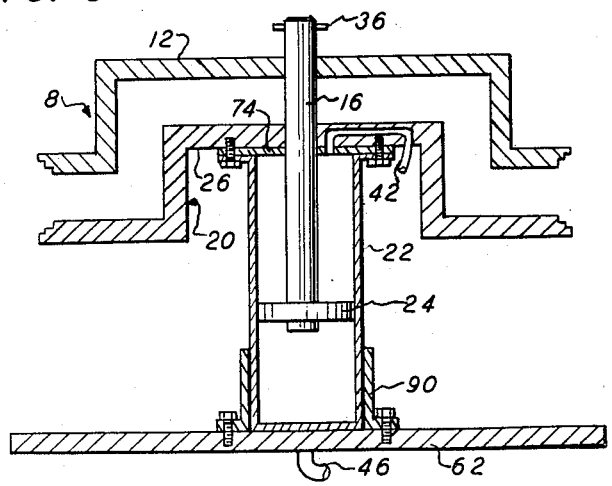
Fig. 5 is a cross sectional elevation of a further embodiment taken along a line similar to line 3—3 of Fig. 2.

A further embodiment of the present invention incorporating some of the advantages of the embodiment of Fig. 1 in a mold where there is limited space therebeneath is illustrated in Fig. 5. Here the cylinder 22 is slidably mounted in a loosely-fitted sleeve 90 bolted on the base plate 62 of the mold, the remainder of the mold being omitted in Fig. 5 in the interest of simplicity. With this arrangement the spider 8 may be removed or placed in position from above while the lower spider projects at all times up through the center portion of a tire. This projection is not normally a deterrent of any sort, but it can be reduced, if desired, by shortening the cylinder to minimum length.

A further advantage according to the present invention is to reduce the number of matrixes in stock per given tire diameter and tread width. The cross-sectional geometry of tires varies considerably and a matrix must conform to the cross-sectional geometry, the diameter and the tread width of a tire. Thus, for a tire of given diameter and tread width, there were as many matrixes as there were tire configurations. Since applicant's device permits some changing of the tire configuration, the number of matrixes per given tire diameter and tread width may be reduced accordingly.

Figures 6, 7:
Figs. 6 and 7 illustrate in cross section differing configurations of automobile tires.
Figure 8:
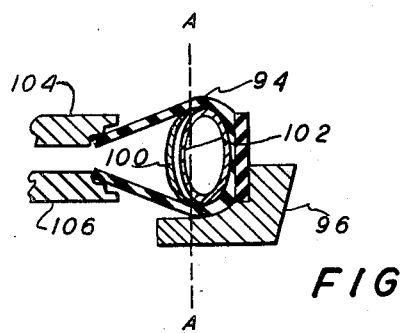
Fig. 8 is a fragmentary sectional elevation illustrating how a tire is shaped and placed in proper position before a mold is closed.

In Figs. 6 and 7, the cross sectional views of the tires 92 and 94 are shown. Comparing the cross sectional configuration of the tire in Fig. 6 with that of Fig. 7, it is readily seen that a matrix which precisely fits one tire would not fit the other, even though both are of the same diameter and have the same tread width. According to this invention a matrix which fits the tire in Fig. 6 may, with applicant's tire inserting device, be used to retread the tire in Fig. 7. In Fig. 8 the tire 94 is shown inserted in a matrix 96 having a contour which fits the tire 92. Once the curing rim 100 and the air bag 102 are inserted in the tire and the pressure segments 104 and 106 actuated toward each other, both walls of the tire to the left of the curing rim are pulled until they are substantially straight. This causes the contour of the tire 94, somewhat round in its normal state, to become more like the contour of the tire 92 which is more slender. Along a line A—A in Fig. 8 the curing rim 100 serves to react against the tire. In effect there is a triangle constituted by the line A—A and the side walls of the tire to the left of this line representing the points of greatest stress. The triangle is closed if the beads of the tire are brought together. It is not necessary in all cases to bring the beads together. It is sufficient merely to eliminate sidewall bulge. In effect the over-all diameter of the tire is reduced because sidewall bulge is stressed into a shape which is substantially straight. It can be seen therefore that by adjusting the position of the pressure segments 104 and 106 the cross sectional configuration of the tire 94 may be changed considerably whereby any one of several matrixes having the correct tread width and tire diameter may be suitably employed.

In view of the foregoing, it is easily seen that applicant's novel tire inserting device is versatile in that it may be adapted to almost all types of molds, and because it may be used to properly shape a tire to fit any one of several types of molds having proper tread width and tire diameter, a large supply of matrixes normally required on hand may be materially reduced.

In operation, molds used with applicant's tire inserting device perform in their usual manner. A typical operation is illustrated with reference to Fig. 3. Commencing with the top spider removed or raised, it is assumed that the upper part of the mold 60 and the matrix 56 are opened and the tire is removed. The first step is to insert the tire 50, with the curing rim 54 and the air bag 52 mounted therein, on the matrix 58. Next the center post 16 is elevated; the spider 8 is placed thereon and allowed to slide down until it engages the upper bead of the tire 50. Then air is supplied to the upper portion of the cylinder 22 through the passageway 71, by means of equipment shown more fully in Fig. 1, and the piston 24 forced downward, thereby stressing the tire 50 in the manner shown in Fig. 8. After the tire 50 is properly shaped as explained above, the upper portion of the mold 60 and matrix 56 are lowered into engagement with the lower half of the mold 62 and clamped. Once the mold portions 60 and 62 are secured in position, the spider 8 may be removed by reversing the air pressure to the lower chamber of the cylinder 22 and forcing the center post 16 upward. This releases the downward force of the pin key 36 on the upper face of the spider 8, and it is a simple matter to lift the spider 8 from the top of the tire. Air pressure to the four-way valve 40 in Fig. 1 may be shut off by some means, not shown, after the center post 16 is forced down by reversing the high pressure air to the upper end of the cylinder so that the pin key 36 rests on the upper face of the spider 20, free and clear of the tire. Steam may then be supplied to the steam chambers 64 and 66 to vulcanize the new tread to the tire.

Once the curing operation is finished, the upper half of the mold 60, the matrix half 56 and the tire may be removed. Should the tire adhere to the matrix halves 56 and 58, it is a simple matter to use a tire pullout hook to disengage the tire. To facilitate this operation the pressure segments 28 cover only a portion of the tire, and a hook may be used to engage the bead of the tire at many points between the pressure segments. In some instances tires with intricate tread designs or tires having siped portions, tiny cuts in the rubber of the tread, adherence to the matrix portion of the mold is often a problem. The tire may be broken loose from the matrix after curing by again closing the beads of a tire with applicant's device, thereby releasing the suction between the matrix and the tread portion of the tire.

What is claimed is:

1. A tire tread centering device comprising in combination an annular mold for receiving a tire to encompass the tread of the tire with the beads of the tire exposed; a cylinder connected to one part of the mold to be in axial alignment with the tire; a single piston adapted for reciprocating movement within the cylinder; a piston rod extending outwardly through one end of the cylinder coaxially with the axis of the tire; first and second spiders each including a hub having a central aperture through which the piston rod passes, a plurality of radially extending arms, each arm being provided with a tire bead-engaging segment at its outer end, said bead-engaging segments being shaped to engage the outer portion of the beads of the tire, said first spider being mounted for slidable movement along the piston rod; means connecting said second spider to said one end of the cylinder; means at the outer end of the rod to confine said first spider between said last-named means and the cylinder; and means for introducing fluid under pressure within the cylinder to either side of the piston, the radially extending arms shaped to enable the beads of the tire to be compressed together between the tire bead-engaging segments of the first and second spiders respectively, when the spiders are brought together upon application of pressure to one side of the piston.

2. A tire tread centering device comprising in combination an annular mold for receiving a tire to encompass the tread of the tire with the beads of the tire exposed, a cylinder connected to one part of the mold to be in axial alignment with the tire; a single piston adapted for reciprocating movement within the cylinder; a piston rod extending outwardly through one end of the cylinder coaxially with the axis of the tire; first and second spiders each including a hub having a central aperture through which the piston rod passes, a plurality of radially extending arms, each arm being provided with a tire bead-engaging segment at its outer end, said bead-engaging segments being shaped to engage the outer portions of the beads of the tire, said first spider being mounted for slidable movement along the piston rod; means connecting said second spider to said one end of the cylinder; a key at the outer end of the piston rod to confine said first spider between the key and the cylinder, said first spider having a keyway in its hub for removal of the spider upon alignment of the key and the keyway; and means for introducing fluid under pressure within the cylinder to either side of the piston, the radially extending arms being shaped to enable the beads of the tire to be compressed between the tire bead-engaging segments of the first and second spiders respectively when the spiders are brought together upon the application of pressure to one side of the piston.

References Cited in the file of this patent

UNITED STATES PATENTS

| | | |
|---|---|---|
| 2,272,231 | Voth | Feb. 10, 1942 |
| 2,353,570 | Kraft | July 11, 1944 |
| 2,475,579 | Napier | July 5, 1949 |
| 2,672,651 | Smyser | Mar. 23, 1954 |
| 2,723,425 | Mattox et al. | Nov. 15, 1955 |
| 2,734,225 | Glynn | Feb. 14, 1956 |